United States Patent  [15] 3,655,084
Willhaus et al.  [45] Apr. 11, 1972

[54] CONTAINER WITH PRESSURE RETAINING SEALING ELEMENTS

[72] Inventors: Werner Willhaus, Stuttgart-Kaltental; Friedrich Scharf, Stuttgart-Stammheim, both of Germany

[73] Assignee: Robert Bosch GmbH, Stuttgart, Germany

[22] Filed: Dec. 15, 1970

[21] Appl. No.: 98,350

[30] Foreign Application Priority Data

Jan. 30, 1970 Germany ................. P 20 04 190.1

[52] U.S. Cl. .................... 215/37 R, 215/1 C, 215/38 R
[51] Int. Cl. ........................................... B65d 51/00
[58] Field of Search ............ 215/37 R, 38 R, 1 C; 229/43, 229/48 SA, 48 T; 220/53

[56] References Cited

UNITED STATES PATENTS 2,783,908   3/1957   Winfield ..................... 215/37 R
3,529,647   9/1970   Ignell ........................ 215/1 C

FOREIGN PATENTS OR APPLICATIONS 452,352      3/1913    France ..................... 215/38 R
1,074,414    7/1967    Great Britain ............. 215/1 C
1,208,401   10/1970    Great Britain ............. 215/38 R Primary Examiner—M. Henson Wood, Jr.
Assistant Examiner—Thomas C. Culp, Jr.
Attorney—Michael S. Striker

[57] ABSTRACT

A container with a material-dispensing portion is disclosed where the material-dispensing portion has an opening disposed in a predetermined plane and has an endless surface, said surface being inclined to said plane. The container is in combination with a sheet-like sealing element having a marginal portion bonded to the surface of the container around the opening and having a median portion overlying the opening, the median portion being inclined with reference to the plane of the opening and making therewith an angle which, at most, slightly exceeds the angle between the plane of the opening and the endless surface of the material dispensing portion.

13 Claims, 2 Drawing Figures

PATENTED APR 11 1972

3,655,084

INVENTOR.
HEINER HILLHAUS
BY FRIEDRICH SCHARF

Michael I. Stoker
Attorney 3,655,084

CONTAINER WITH PRESSURE RETAINING SEALING ELEMENTS

BACKGROUND OF THE INVENTION

It is known and common practice to seal containers with a planar sealing plate of metal foil or synthetic resin foil, where the outer face of the opening of the container lies in a plane. Attempts have been made to seal liquids which contain gas in solution in such containers, a principal example being beer. It has been found, however, that a gas pressure builds up within the container, the sealing plate bulges out and peels away from the mouth of the container. It has been concluded, therefore, that this type of seal is unsuitable for use in those cases where pressure builds up in the container.

SUMMARY OF THE INVENTION

It is an object of the invention to construct a container with a simple seal which can be maintained against the pressure resulting from the evolution of gas from liquids.

It is a further object of the invention to construct a container and seal which can retain gas pressure and where the container is made of synthetic resin.

In order to achieve the objects of the present invention, the rim around the material dispensing portion of the container and the sealing element in the neighborhood of the sealing seam between the rim and the sealing element are inclined at an angle to the plane defined by the rim around the material-dispensing portion of the container. Further, that portion of the sealing element henceforth referred to as a cap, overlying the material-dispensing portion of the container, henceforth referred to as the mouth, also makes an angle with the plane defined by the rim of the container, and the former angle is greater than, equal to, or slightly less than the latter angle. Stated, conversely, the angle between the median portion of the cap and the reference plane is, at most, slightly greater than the angle between the part of the cap in contact with the rim of the container and the reference plane.

The purpose of the construction modification in accordance with the present invention is to change the type of stress to which the bond between the closure and the vessel is subjected. In the usual construction, failure takes place by peeling in which the bond is subjected to tension over a restricted area which is much smaller than the total area of the bond. In contrast, using a dished cap and a bond over an inclined surface, the bond is stressed in shear. With this design, then, it is possible to bond a cap to a container where the bond is to resist the thrust of gas evolved from the liquid content.

The closure element is preferably made of synthetic resin or metal foil, punched and formed in a single operation. In further processing with the help of pressure and heat the closure is then sealed over the mouth of the filled container.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
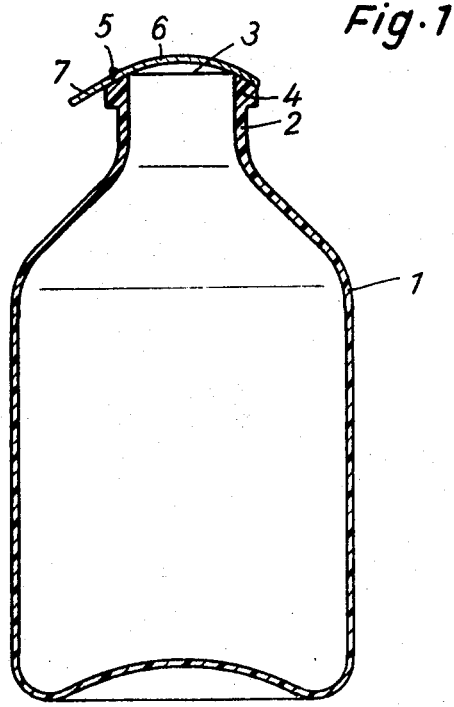
FIG. 1 shows a container with a cap sealed over the top, in cross section.

The container 1 which may be a bottle, is prepared from thermoplastic synthetic resin by blow molding; it has a neck 2 in which there is a mouth or opening 3 surrounded by a collar 4.

The upper face 5 of the collar 4, which may be viewed as an endless surface, has the form as a zone of a sphere. The cap 6 is made of a metal-foil coated with a heat-sealable material and is sealed to the surface 5. The cap 6 has the form of a cap, the radius of which corresponds to the radius of the spherical zone of the collar 4. The cap 6 has a tab 7 which extends outward from the outer periphery of the cap.

A variety of physical properties in the closure can be achieved by forming the cap so that it has other curvatures. Examples are the surfaces prepared by rotating the conic sections, examples being paraboloids, ellipsoids, and hyperboloids of revolution. The surface 5 with which the cap must mate, must also have the appropriate form such as a zone of a surface obtained by rotating a conic section.

It is essential that the form of the cap 6 and the surface 5 of the mouth of the bottle should incline in the region of the seal of the bottle at an angle to the plane as defined by the mouth of the bottle which is larger than, equal to, or only slightly less than the angle formed by the bulged-out portion of the cap lying over the mouth of the bottle and the same reference plane. In establishing the angle of inclination of the surface which is to be sealed, it must be noted that the preformed bulge of the closure will be increased as a result of the internal pressure in the container and the angle of inclination of the bulge at the inner surface of the seal will be increased even more. The angle of inclination in the region of the seal can either be constant or variable.

Figure 2:
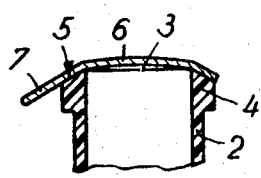
FIG. 2 shows in cross section a further example of the method of closure.

In the example illustrated in FIG. 2, the closure 6 has not merely a single generated surface, but rather essentially two surface regions, namely a region in the area over the surface 5 which is a frustum of a cone and a planar or outwardly bulged zone in the median region. It is also essential here that the angle of inclination in the region of the seal be not substantially less and preferably greater than the angle of inclination of the bulge of the cap as it meets the inner portion of the seal.

During transportation the sealed container may be exposed to temperatures up to 40° C. Since the internal pressure will be increased by the rise in temperature, it is desirable that the cap be made of metal foil with a coating which will hold fast at temperatures up to at 50° C., and the softening point of which is over 70° C. Such coatings can be prepared on the basis of polyvinyl chloride-mixed polymer.

It should be noted that the two examples shown in the figures constitute the presently preferred embodiments of the invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Container, particularly bottle, including a material-dispensing portion having an opening disposed in a predetermined plane, and having an endless surface, said surface being inclined to said plane; and a sheet-like sealing element having a marginal portion bonded to said surface and a median portion overlying said opening, said median portion being inclined with reference to said plane and making therewith an angle which at most slightly exceeds the angle between said plane and said surface.

2. Container as defined in claim 1, wherein said container consists, at least in part of a thermoplastic synthetic resin.

3. Container as defined in claim 1, wherein said dispensing portion and said sealing element form a circumferentially complete seam located in a plane which is parallel to said predetermined plane.

4. Container as defined in claim 1 wherein said dispensing portion and said sealing element form a circumferentially complete and wide seam.

5. Container as defined in claim 1 wherein the inclination of said endless surface and of said sealing element in the region of said marginal portion is constant.

6. Container as defined in claim 1 wherein the inclination of said endless surface and of said sealing element in the region of said marginal portion is variable.

7. Container as defined in claim 1 wherein said endless surface and said marginal portion of said sealing element each have a shape such as is generated by rotation of a conic section.

8. Container as defined in claim 7 wherein said marginal portion of said sealing element has the form of a conical frustum.

9. Container as defined in claim 1 wherein the inclination of said marginal portion of said sealing element is greater than the inclination of said median portion.

10. Container as defined in claim 1 wherein said sealing element is concavo-convex, said concave surface facing toward said opening of said material-dispensing portion.

11. Container as defined in claim 1, wherein said sealing element comprises a metal foil coated on the surface facing toward said opening of said material-dispensing portion.

12. Container as defined in claim 1 wherein said sealing element comprises a gripping tab.

13. Container as defined in claim 1 wherein said sealing element comprises a thermoplastic synthetic resin.

* * * * *